ened thereby will not materially affect the sweetening thereof. Furthermore, the common salt and water functions effectively as a carrier for the pure sacchrain enabling it to be more uniformly mixed with a liquid, solid or semi-solid food to be sweetened thereby, in addition to the salt functioning to blend the extreme sweetness of the saccharin with other tastes to produce a more satisfactory tasting sweetening agent. For canning purposes, three teaspoons of the solution may be mixed with a quart of water and the fruit, to be canned, being then placed in the quart of sweetened water to cook in the same manner as it would be cooked in a sugar syrup or the sweetened water may be poured over fruit in jars in canning by a cold pack method.

UNITED STATES PATENT OFFICE 2,570,272

SACCHARIN COMPOSITION

Floy E. Pilcher, Hartford, Wash.

No Drawing. Application July 22, 1949, Serial No. 106,327

4 Claims. (Cl. 99—141)

This invention relates to a saccharin composition for use by diabetics and others who are unable to use sugar and has for its primary object to provide a sweetening agent wherein the percentage of the pure saccharin to the total volume is materially reduced so that the composition may be much more efficiently utilized as a sweetening agent than pure saccharin and much more readily mixed thoroughly with a solid, semi-solid or liquid to be sweetened thereby.

A further object of the invention is to provide a saccharin composition including a blending agent comprising sodium chloride which functions primarily with the pure saccharin to give a better body to the sweet taste and secondarily to prevent stagnation and as a preservative when the composition is mixed with water.

A further and particularly important object of the present invention is to provide a saccharin composition wherein, due to the very small percentage of pure saccharin compared to the total volume of the composition not only is it possible to accomplish a much more uniform mixture of the sweetening composition with the liquid or solid food to be sweetened but which will enable the use of the mixture as a sweetening agent without danger of spoiling the food by adding slightly more of the sweetening agent than would ordinarily be required to sweeten the food and which is not possible where pure saccharin is used, due to the very small amount of pure saccharin required, so that the use of an excess amount of the pure saccharin results in sweetening the food to a point where it is sickening sweet and not palatable.

The improved composition constituting the invention is capable of being produced for sale in either a solid or a liquid form.

For producing the composition in a liquid form a preferred formula is as follows:

Pure powdered saccharin, 1 ounce
Sodium chloride, 3 ounces
Water, 96 ounces

The powdered saccharin and sodium chloride or salt are preferably mixed with hot water since the salt and saccharin will more readily dissolve in hot water than in cold water although water of substantially any temperature may be utilized. The resulting solution constitutes a one percent saccharin solution and may be utilized in the proportion of one teaspoon of the solution to one pint of a liquid to be sweetened and is sufficiently weak so that slight variations in the measurement of the solution to the liquid to be sweetened thereby will not materially affect the sweetening thereof. Furthermore, the common salt and water functions effectively as a carrier for the pure sacchrain enabling it to be more uniformly mixed with a liquid, solid or semi-solid food to be sweetened thereby, in addition to the salt functioning to blend the extreme sweetness of the saccharin with other tastes to produce a more satisfactory tasting sweetening agent. For canning purposes, three teaspoons of the solution may be mixed with a quart of water and the fruit, to be canned, being then placed in the quart of sweetened water to cook in the same manner as it would be cooked in a sugar syrup or the sweetened water may be poured over fruit in jars in canning by a cold pack method.

While extensive experiments disclose that the percentage of one part saccharin to three parts sodium chloride or salt when mixed with ninety-six parts water produces a sweetening solution which is most palatable, the percentage of the salt to the pure saccharin can be varied within the range of one part salt to one part saccharin to four parts of salt to one part saccharin and mixed with ninety-six parts of water.

The sweetening composition, previously described, may be completely mixed with the water or may be produced in a dry state of one part pure saccharin to preferably three parts of sodium chloride to be sold in this manner and to be subsequently mixed by the user, according to directions, with ninety-six parts water. When the compound is prepared for sale in a dry state it may be sold in either a loose, powdered form or may be pressed into tablets of different sizes, each of which tablets may then be mixed with a predetermined quantity of water according to directions and depending upon the size of the individual tablet.

In addition to the fact that sodium chloride acts as a blending agent causing the peculiar sweet taste of saccharin to blend much more readily with other tastes and in combination with the water to cause the saccharin to more thoroughly and uniformly intermingle with the fluid and liquid or solid form to be sweetened thereby, the compound constituting a one percent saccharin solution enables the use of saccharin, in the solution, for cooking and canning and for table use by untrained persons and which is substantially impossible when using pure saccharin in tablet form or in powdered form, when available, since due to its highly concentrated state it is very difficult to measure a proper quantity of the saccharin and an excessive amount thereof, while even quite slight, will render the food too sweet to be palatable. Furthermore, since it is difficult to thoroughly mix pure saccharin with a food to be sweetened thereby, even if the saccharin is accurately measured a part of the food will be oversweetened and thereby rendered unpalatable while the remainder of the food will contain substantially no sweetening.

While preferred forms of the invention have been heretofore described in detail, it will be understood that variations in the formula thereof may be resorted to without departing from the spirit or scope of the invention as hereinafter defined by the appended claims.

I claim as my invention:

1. A sweetening composition comprising approximately one part pure saccharin, approximately one to four parts sodium chloride and approximately ninety-six parts water in which the saccharin and sodium chloride are dissolved.

2. A sweetening composition comprising approximately one part pure saccharin, approximately three parts sodium chloride and approximately ninety-six parts water in which the saccharin and sodium chloride are dissolved.

3. A sweetening composition comprising one part saccharin and one to four parts sodium chloride intimately mixed with the saccharin to provide a powder adapted to be dissolved in approximately ninety-six parts of water.

4. A sweetening composition comprising one part saccharin and one to four parts sodium chloride intimately mixed with the saccharin to provide a powder adapted to be pressed into tablet form, said tablets being adapted to be dissolved in approximately ninety-six parts of water.

FLOY E. PILCHER.

REFERENCES CITED

The following references are of record in the file of this patent:

FOREIGN PATENTS

| Number | Country | Date |
|---|---|---|
| 9,669 | Great Britain | 1900 |
| 314,500 | Great Britain | June 28, 1929 |

OTHER REFERENCES

"The Chemical Senses," by Moncrieff-Leonard Hill Limited, 17 Stratford Place, W. 1, London, 1944, page 257.